(12) United States Patent
Lantz (10) Patent No.: US 7,174,993 B2
(45) Date of Patent: Feb. 13, 2007

(54) SAFETY RAILING (76) Inventor: Thomas M. Lantz, 2331 Buchanan Rd., Evansville, Vanderburgh County, IN (US) 47701

( * ) Notice: Subject to any disclaimer, the term of this patent is extended or adjusted under 35 U.S.C. 154(b) by 355 days.

(21) Appl. No.: 10/794,642

(22) Filed: Mar. 5, 2004

(65) Prior Publication Data
US 2004/0173406 A1 Sep. 9, 2004

Related U.S. Application Data (60) Provisional application No. 60/452,092, filed on Mar. 6, 2003.

(51) Int. Cl.
B60R 3/00 (2006.01)

(52) U.S. Cl. .................. 182/127; 182/113; 182/106; 280/164.1; 280/166

(58) Field of Classification Search ............... 182/113, 182/127, 19, 106; 280/166, 164.1
See application file for complete search history.

(56) References Cited

U.S. PATENT DOCUMENTS

| 4,371,056 A * | 2/1983 | Anglade ............... 182/127 |
| 4,613,155 A * | 9/1986 | Greenwood ........... 280/760 |
| 4,936,407 A * | 6/1990 | Brock et al. ........... 180/271 |
| 5,343,977 A * | 9/1994 | Bryan .................... 182/106 |
| 5,547,040 A * | 8/1996 | Hanser et al. ......... 182/88 |
| 6,068,277 A * | 5/2000 | Magnussen ............ 280/166 |
| 6,598,704 B2 * | 7/2003 | Hansen .................. 182/113 |
| 6,739,349 B2 * | 5/2004 | Kastenschmidt et al. 137/15.16 |
| 2003/0020253 A1 * | 1/2003 | Bosman et al. ........ 280/164.1 |

* cited by examiner

Primary Examiner—Alvin Chin-Shue
(74) Attorney, Agent, or Firm—Gary K. Price, Esq.

(57) ABSTRACT

A vertically adjustable safety railing system for obtaining safety railing access to the tops of mobile equipment of various heights such as tank trucks. The safety railing apparatus generally includes a plurality of posts, a railing, and activating means in communication with an actuating means. The safety railing having a collapsed condition and a vertically upright condition. The posts are pivotally mounted to mounting plates as well as connected to the railing so that when the posts are rotated to a vertically upright condition, the railing is elevated providing a railing to assist a person walking on top of the tank of a truck. The activating means is engaged by a cover plate hinged to a ladder disposed at the rear of the tank truck. Opening the cover plate to access the ladder places the activating means in a passing condition and actuates the actuating means to pivot the railing system to its upright condition. Closing the cover plate places the activating means in its normally non-passing condition and returns the railing system to its collapsed condition.

2 Claims, 9 Drawing Sheets

SAFETY RAILING

CROSS REFERENCES TO RELATED APPLICATIONS

U.S. Provisional Application for Patent No. 60/452,092, filed Mar. 6, 2003, with title "Safety Railing" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention relates generally to a safety railing, and in particular, to a vertically adjustable safety railing system for obtaining safety railing to the tops of mobile equipment of various heights such as tank trucks.

2. Brief Description of Prior Art

Tank trucks are popular for hauling gases, liquids, and even solids such as powders of various kinds. The tanks of such trucks tend to have circular cross sections, that are hazardous to walk on. While a tread plate is often added to facilitate walking on the tanks, there is a need for safety railing.

For many years various governmental agencies such as the Occupational Safety and Health Administration (OSHA) have been actively promulgating regulations designed to create a healthier, safer environment for the industrial worker. In particular, regulations have focused upon the methods and equipment used in the accessing of mobile equipment such as tank trucks. While there exists safety platforms for access to the top of mobile equipment, the inventor is unaware of safety railing to facilitate walking on the tanks.

As will be seen from the subsequent description, the preferred embodiments of the present invention overcome shortcomings of the prior art.

SUMMARY OF THE INVENTION

The present invention is a vertical adjustable safety railing system for obtaining safety railing access to the tops of mobile equipment of various heights such as tank trucks. The safety railing of the present invention is a collapsible safety rail apparatus including a railing, posts, mounting plates, activating means, and actuating means. The railing and posts have a collapsed first position that is a minimum height position and a second position that is a vertically erected position. The posts are pivotally mounted to the mounting plates as well as pivotally connected to the railing so that when the posts are rotated into position, the railing is elevated into the vertically erected position, providing a railing to assist a person in walking on top of the tank of a truck.

DESCRIPTION OF THE PREFERRED EMBODIMENT

In accordance with the present invention, a safety railing is disclosed. The safety railing of the present invention is an effort to conform to requirements of OSHA regulations, and provides an improved safety railing system for accessing the tops of various types of mobile equipment of various heights such as tank trucks. Specifically, it will be noted in the drawings that the collapsible safety railing assists persons in walking on top of various types of mobile equipment such as tank trucks. In the broadest context, the safety railing consists of components configured and correlated with respect to each other so as to attain the desired objective.

FIGS. 1–9 illustrate a preferred embodiment of a collapsible safety railing 10 made in accordance of the present invention. As will be described, the safety railing 10 is generally for use in providing a railing to assist a person in walking on the top of mobile equipment of various heights such as tank trucks.

Figure 1:
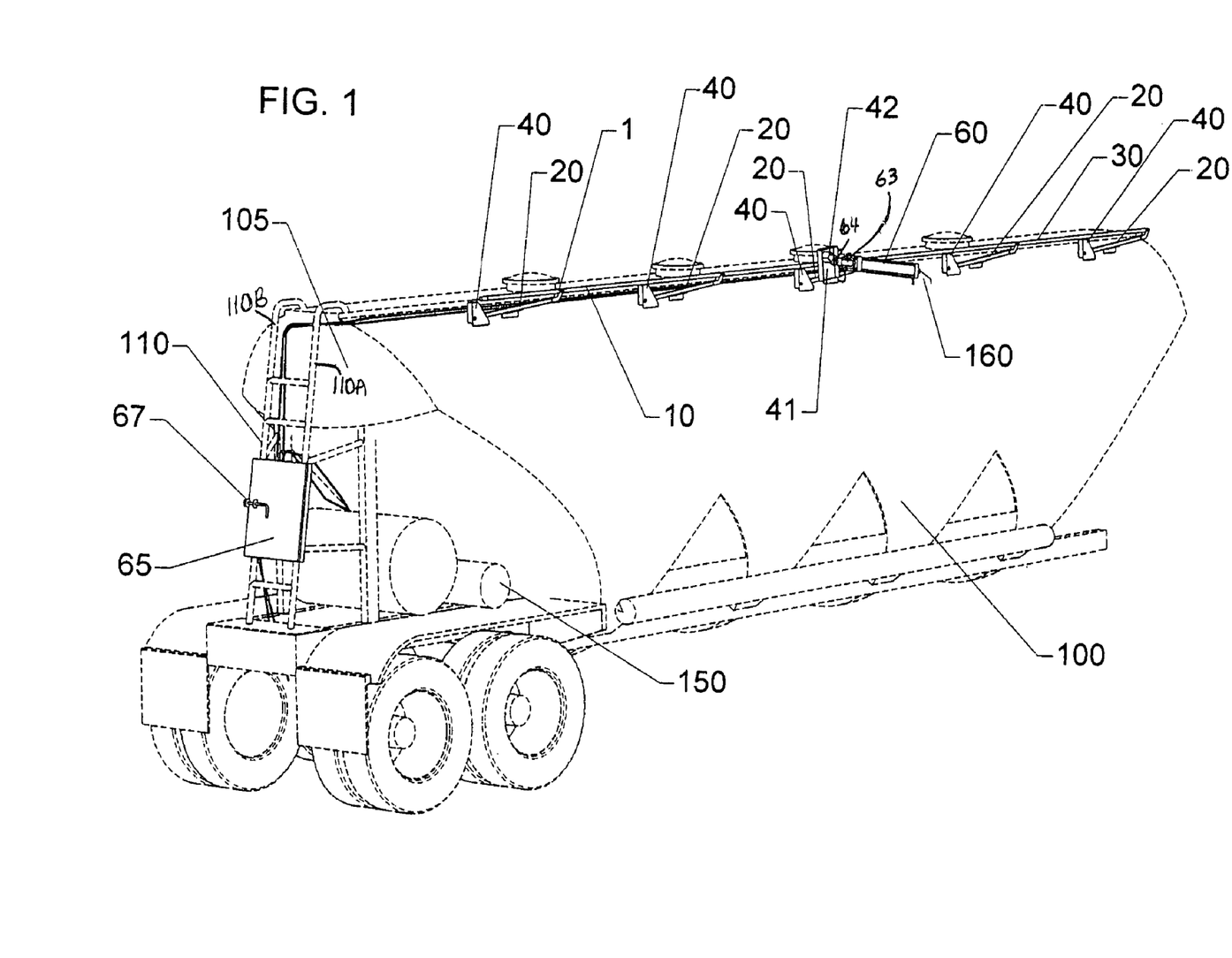
FIG. 1 is a perspective view of the preferred embodiment of the present invention, a collapsible safety railing apparatus installed to a tank of a truck.
Figure 3:
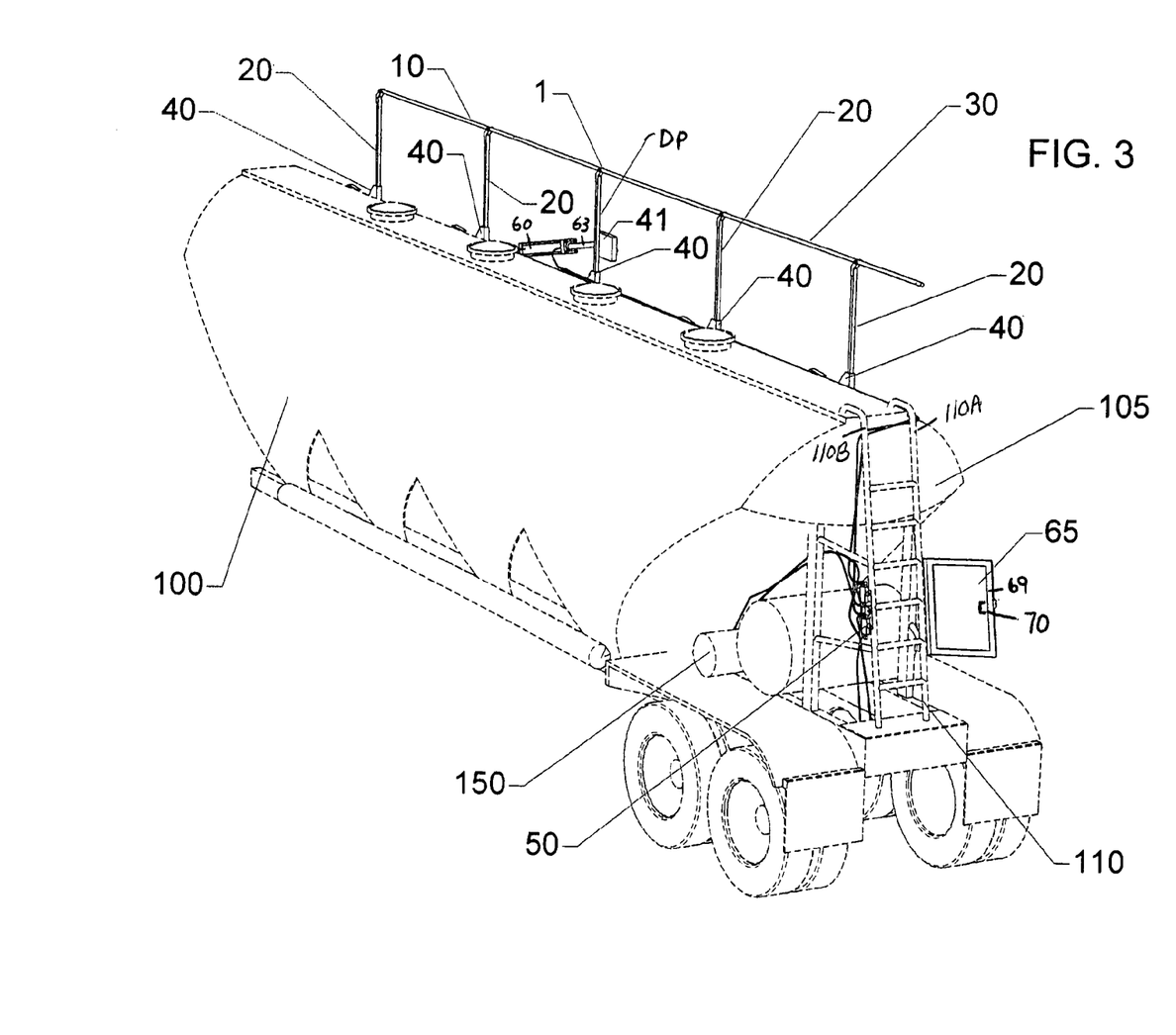
FIG. 3 is a perspective view of the safety railing of FIG. 1 in an activated, or use condition.

Referring to FIG. 3, the collapsible safety railing 10 is disclosed. The safety railing 10 generally including a plurality of posts 20, a railing 30 attached to the posts 20, and an activating means 50 connected to an actuating means 60. The activating means 50 to actuate the railing system 10 to an activated, or use condition as shown in FIG. 3, or a de-activated, or non-use condition as shown in FIG. 1.

Figures 6, 7, 8:
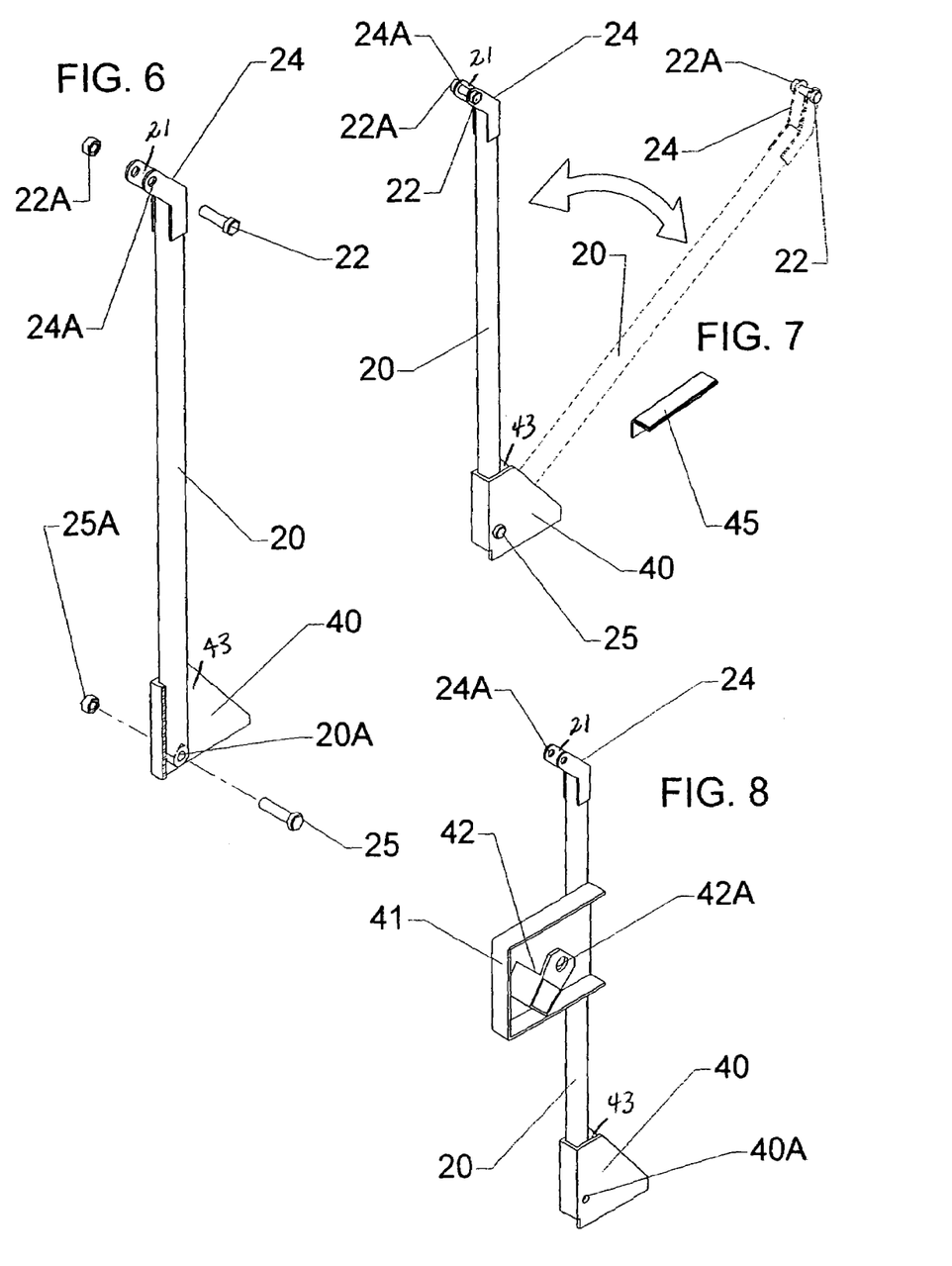
FIG. 6 is a perspective view of the safety railing's post.
FIG. 7 is a perspective view of the post in FIG. 6 in an activated condition, and the dashed lining illustrating the post lowering to a de-activated condition.
FIG. 8 is a perspective view of the post of FIG. 7, and further illustrated the post actuating member.

Referring to FIGS. 6, 7 and 8, the posts 20 include an offset bracket 24 attached to one end of the post 20, and a mounting bracket 40 attached to the opposite end of the post 20. As will be described, the posts 20 are pivotally mounted to the mounting plate 40 as well as pivotally connected to the railing 30 so that when the posts 20 are raised to an activated position, the railing 30 is elevated providing a railing system to assist a person in walking on top 160 of the tank 100.

The offset bracket 24 has at least one aperture 24A for receipt of bolt 22, and further defines an offset clearance 21 for, as will be described, receiving and attaching the railing 30 to the post 20 with the bolt 22 and a nut 22A.

The mounting bracket 40 has at least one aperture 40A (shown in FIG. 8) for receipt of a pivoting bolt 25, and further includes an open end for receipt and pivotal placement of the post 20. In particular, the post 20 includes an aperture 20A and is attached to the mounting bracket 40 by aligning apertures 20A and 40A. The post 20 is then pivotally attached to the mounting bracket 40 with bolt 25 and a nut 25A.

The post 20 can be positioned so that the railing system 10 is in an activated, or use condition, or in a de-activated, non-use condition. In use, the posts 20 are in a vertically upright condition as shown in FIG. 3. In this condition, the railing system 10 is suitable for providing a railing to assist a person in walking on the top surface 160 of a tanker 100. In the de-activated condition as shown in FIG. 1, the railing system 10 is in a collapsed state. In the collapsed state, the railing system 10 is of minimum height and is in the preferred state during travel of the truck, as well as times when a person is not accessing the top 160 of the tank 100 of the truck.

FIG. 7 illustrates the post 20 being in the vertically upright, or activated condition, and the dashed lining illustrates the post 20 being lowered to the collapsed, or de-activated condition. The posts 20 selectively shift or pivot along the open end 43 of the mounting bracket 40 in either direction as the arrow shows in FIG. 7.

Each mounting plate 40 further includes a mounting base 45 (shown in FIG. 7) that is affixed to the mounting plate 40. Each mounting plate base 45 is attached to the upper surface 160 of the tank 100 of the truck, preferably by welding.

Figures 9, 9A:
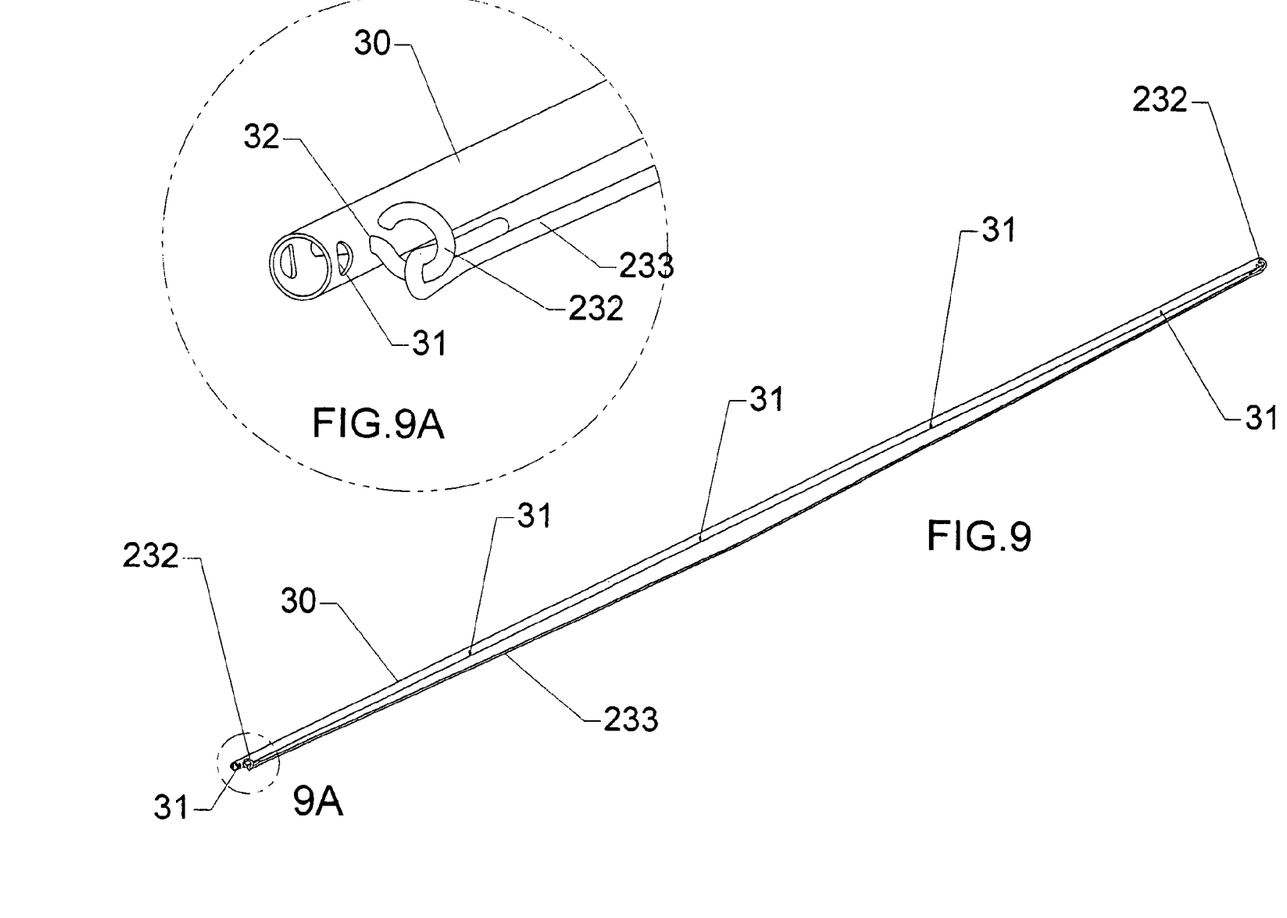
FIG. 9 is a perspective view of the safety railing's railing.
FIG. 9A is an enlarged view of the railing of FIG. 9.

Referring to FIG. 9, the railing 30 includes a plurality of apertures 31 that in application, align with the aperture 24A of the offset bracket 24 of each post 20. As shown in FIG. 3, the railing 30 is positioned within the offset clearance 21 of each of the plurality of posts 20 so that the aperture 24A is in alignment with the aperture 31. In particular, the post 20 is attached to the railing 30 by aligning apertures 24A and 31. The post 20 is then attached to the railing 30 with bolt 22 and nut 22A.

As known in the art, the tank 100 generally has a ladder 110 (shown in FIGS. 1–4) disposed at the rear 105 of the tank 100. As understood, the ladder 110 provides a person access to the top 160 of the tank 100 from the ground surface. As shown in the drawings, the ladder 110 includes a first vertical rail 110A and a second vertical rail 10B parallel with the first vertical rail 110A. The vertical rails 110A, 110B define the width of the ladder 110.

Figure 2:
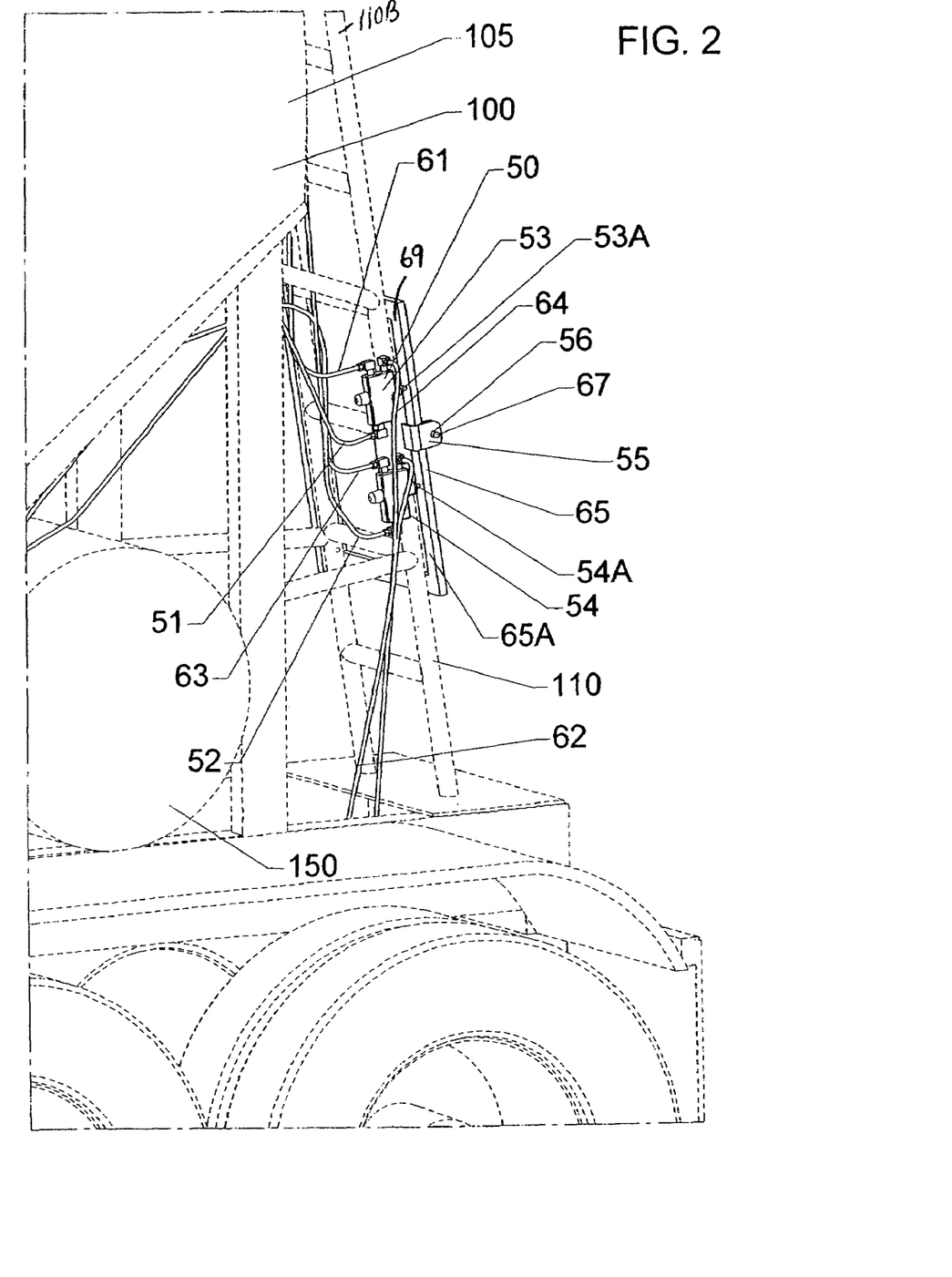
FIG. 2 is a side view of the safety railing's activating means.
Figure 4:
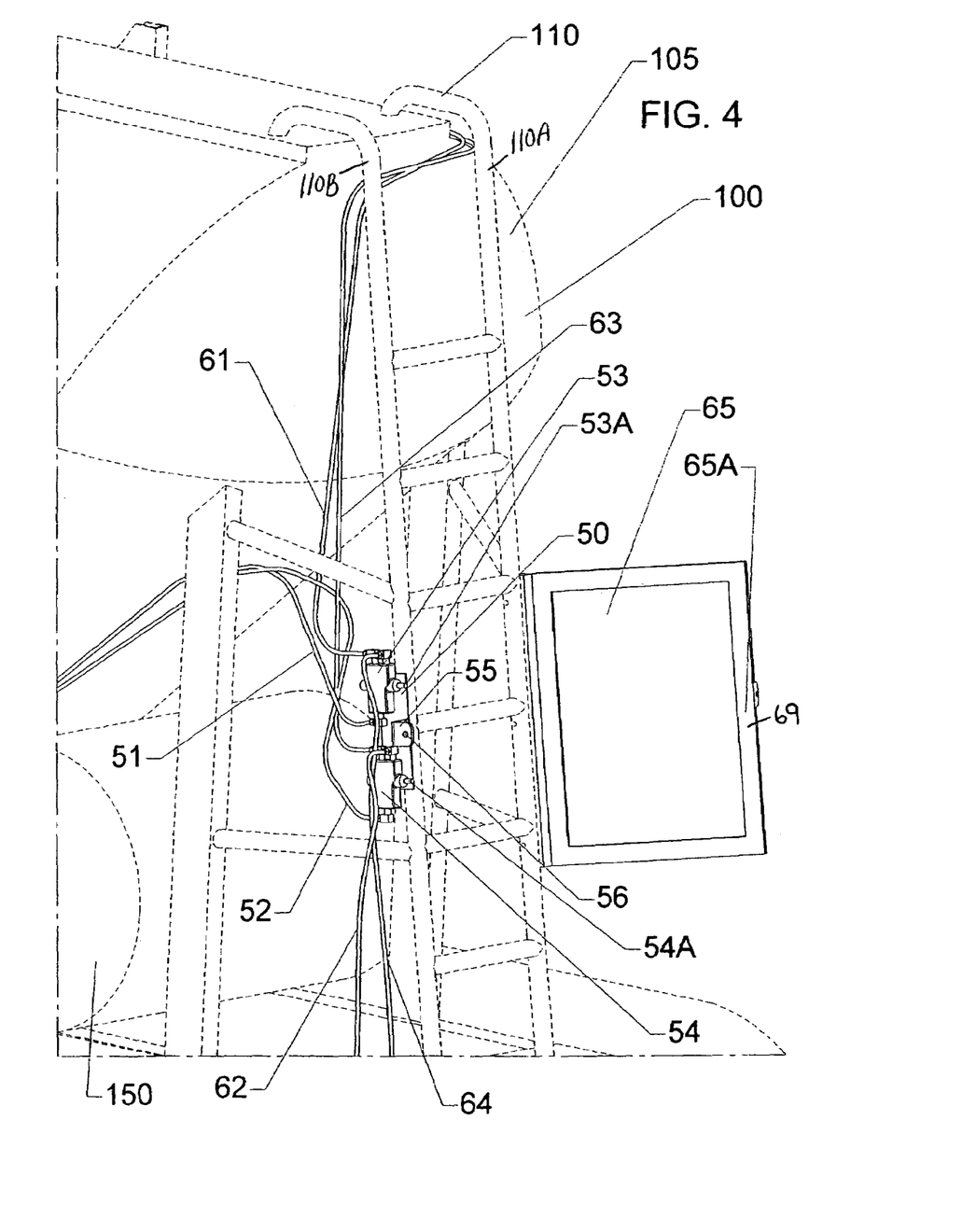
FIG. 4 is a perspective view of the safety railing's ladder cover plate in an open position.

A ladder cover plate 65 is hinged to one of the vertical rails preferably the first vertical rail 110A of the ladder 110. The ladder cover plate 65 includes a gate lock 67, and can be positioned to an open position as shown in FIGS. 3 and 4, or a closed position as shown in FIGS. 1 and 2. A striker plate 55 is attached to the vertical rail opposite the vertical rail the cover plate 65 is hinged, for purposes of this description the second vertical rail 110B of the ladder 110. The striker plate 55 includes a striker receiving aperture 56 (shown in FIG. 4) sized to receive the gate lock 67 when the cover plate 65 is in the closed position. As known in the art, inserting the gate lock 67 through the aperture 56 of the striker plate 55 will secure the cover plate 65 in the closed position.

As best shown in FIG. 2, the activating means 50 includes a first valve 53 and a second valve 54 appropriately attached to the same vertical rail as the striker plate 55, adjacent the striker plate 55. While the drawings illustrate the striker plate 55 positioned between the valves 53, 54, it will be understood that the valves 54, 54 may be selectively positioned along the vertical rail.

The first valve 53 includes a first switch 53A, and the second valve 54 includes a second switch 54A. The first switch 53A and second switch 54A project from the respective first and second valves 53, 54 so that a surface 69 of the ladder cover plate 65 is in engaging communication with the switches 53A, 54A when the cover plate 65 is in the closed position.

As stated, the activating means 50 of the safety railing 10 includes the valves 53, 54. In particular, the first valve 53 for actuation of vertically raising the railing system 10 to an activated, or use condition as will be described, and the second valve 54 for actuation of the vehicle's parking brake 120 (illustrated in FIG. 10). The surface 69 can include a lock out/tag out device 70 that would prevent someone from inadvertently closing the plate 65 with an operator on top of the tank 100.

As best shown in FIGS. 2, 3, 4 and 10, the first valve 53 includes a first line 51 having one end appropriately connected to the first valve 53 and the opposite end preferably connected to the vehicle's air supply system 150. The second valve 54 likewise includes a first line 52 having one end appropriately connected to the second valve 54 and the opposite end preferably connected to the vehicle's air supply system 150.

Figure 10:
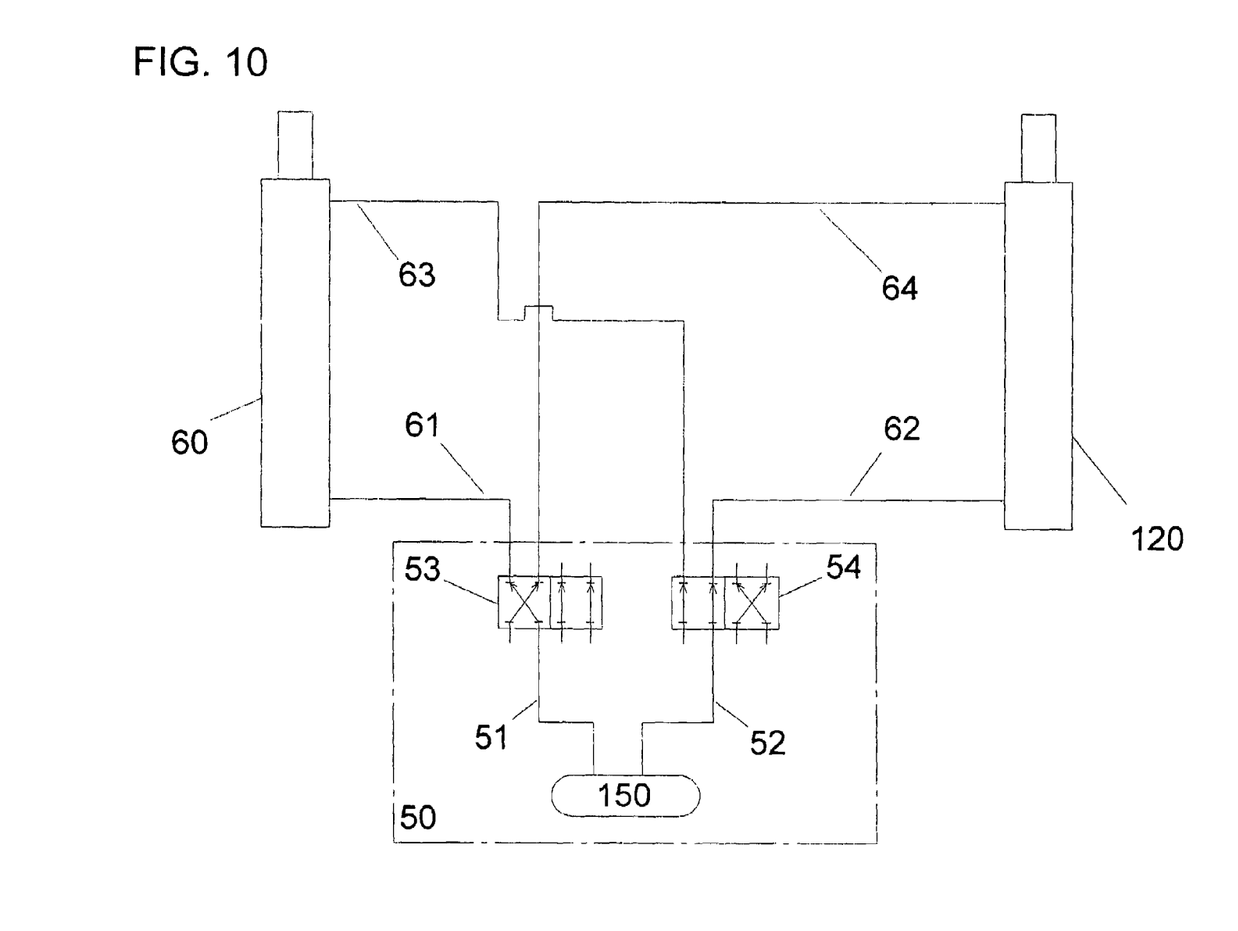
FIG. 10 is a schematic drawing to illustrate the operation of the safety railing's activating means.

The first valve 53 further includes a second line 61 having one end appropriately connected to the first valve 53 and the opposite end appropriately connected to the rail system's 10 actuating means 60 (shown in FIGS. 1 and 10). The second valve 54 further includes a second line 62 having one end appropriately connected to the second valve 54 and the opposite end appropriately connected to the vehicle's parking brake 120.

As stated, the second line 61 of the valve 53 is directed to the actuating means 60. In the preferred embodiment, the actuating means 60 is disposed on the top surface 160 of the vehicle tank 100, adjacent one of the posts 20. In particular the actuation means 60 is positioned near the "driving post," which is the selected post 20 positioned at the approximate midway along the length of the top surface 160 of the tank 100. Referring to FIG. 3, the selected driving post 20 has been further designated "DP".

In the preferred embodiment, the actuating means 60 is a cylinder. The cylinder 60 includes a ram 63 that is telescopically adjusted to an extended or retracted position. The ram 63 of the cylinder 60 is attached to a post actuation member 41 with a connector pin 64 (shown in FIG. 1). As will be further discussed the post actuation member 41 is attached to the driving post 20.

Figure 5:
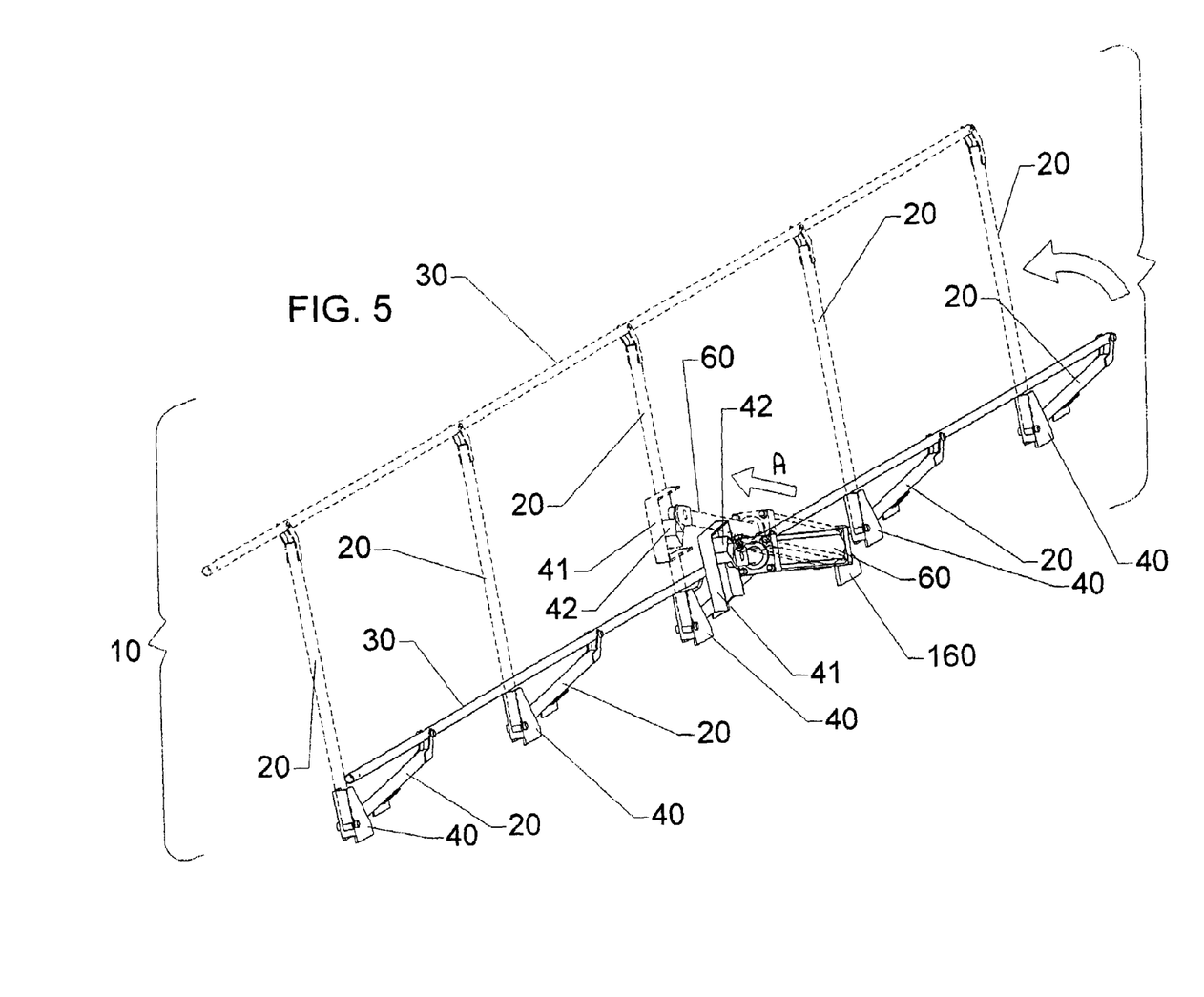
FIG. 5 is a perspective view of the safety railing's rail system in a de-activated, or non-use condition, and the dashed lining illustrating the rail system in an activated, or use condition.

The ram 63 is telescopically adjusted to be shorter (retracted position) or longer (extended position) along an axis illustrated by arrow "A" shown in FIG. 5. In the retracted position as shown in FIG. 5, the railing system 10 is in the de-activated, or non-use condition as previously described. When the ram 63 is in the extended position as shown with dashed lining in FIG. 5, the railing system 10 is in the activated, or use condition.

Referring to FIG. 8, the post actuation member 41 includes a pivot member 42 having an aperture 42A. As stated, the post actuation member 41 is attached to the driving post 20. The ram 63 of the cylinder 60 is connected to the pivot member 42 of the post actuation member 41 with the connector pin 64. As such, movement of the ram 63 will have a resulting affect on the driving post 20. In particular, expanding the ram 63 forces the driving post 20 in an upwardly direction until the driving post 20 is in a vertically upright position. As should be understood, forcing the driving post 20 upward will cause the remaining posts 20 to pivot upward. Likewise, retracting the ram 63 pulls the driving post 20 in a downwardly direction until the driving post 20 is in the collapsed condition. Again, pulling the driving post 20 downward will cause the remaining posts 20 to pivot to the collapsed condition.

The activating means 50 of the present invention is engaged by operation of the ladder cover plate 65. In the preferred embodiment, the first and second valves 53, 54 of the activating means 50 would be normally open (i.e. non-passing condition), or closed (i.e. passing condition) based upon whether the ladder cover plate 65 is open or closed. In particular, when the operator opens the ladder cover plate 65 in order to access the ladder 110 to climb onto the top 160 tank 100, the cover plate 65 and the switches 53A, 54A are no longer in contact and therefore disengaged. Disengaging the switches 53A, 54A opens the lines 51, 52 directed to the vehicle's air supply system 150 allowing air pressure to pass from the supply system 50 and through the valves 53, 54. Air pressure passing through valve 53 and into line 61 is directed to the cylinder 60. The air pressure to the cylinder 60 forces the ram 63 to expand thereby pushing the driving post 20 in an upwardly direction as discussed above, until the driving post 20 is in a vertically upright position. As discussed, forcing the driving post 20 upward will cause the remaining posts 20 to pivot upward, and the railing system 10 to an activated, or use condition. Air pressure passing through valve 54 and into line 62 is directed to engaging the vehicle's parking brake 120 in order to prevent movement of the vehicle while in the activated, or use condition.

When the operator closes the ladder cover plate 65 as discussed above, the surface 69 of the cover plate 65 returns in contact with the switches 53A, 54A and the activating system 50 returns to its normally open state. In the open state, the lines 51, 52 directed to the vehicle's air supply system 150 are closed and prevents air pressure to further pass from the supply system 150 to the valves 53, 54. Removing the air pressure causes the ram 63 to retract thereby pulling the driving post 20 in a downward direction as discussed above, until the driving post 20 is in the collapsed condition. As discussed, pulling the driving post 20 downward will cause the remaining posts 20 to collapse, and the railing system 10 to a de-activated, or non-use condition. Likewise, removing air pressure passing through valve 54 and into line 62 causes the vehicle's parking brake 120 to disengage.

The activating means 50 can be engaged and disengaged by air pressure, or by other means known in the art including hydraulic, electric, or some combination thereof. The actuating means 60 could be, but not restricted to, an air powered means, an electric powered means, or a hydraulic powered means. The activating means 50 is connected to and triggers the actuating means 60, by sending an air pressure activating signal through lines 51 and 52 in the present embodiment. It would be possible for the activating signal to be an electrical signal, a hydraulic signal, a mechanical signal or a combination thereof.

In operation, the safety railing system 10 of the present invention is normally in its collapsed position as shown in FIG. 1. To access the top 160 of the tank 100 of the truck, the operator will climb the ladder 110 disposed at the rear 105 of the tank 100. Opening the ladder cover plate 65 (shown in FIG. 4), to access the lower steps of the ladder 110 in order to climb on to the tank 100 separates the surface 69 of the cover plate 65 from the switches 53A, 54A, and actuates the activating means 50 to lock the parking brakes of the vehicle, and second, actuates the actuating means 60 as discussed above. Air pressure to the actuating means 60 forces the posts 20 to pivot upward thereby raising the railing system 10 to an activated, or use condition. The safety railing system 10 then provides a safety railing to assist a person in walking on the top 160 of the tank 100.

After access to the top of the tank 100 is completed, the operator climbs down the ladder 110 and closes the ladder cover plate 65. Once the surface 69 of the cover plate 65 engages the switches 53A, 54A, the activating system 50 returns to its normally open state. In the open state, the lines 51, 52 directed to the vehicle's air supply system 150 are closed and prevents air pressure to further pass from the supply system 150 to the valves 53, 54. Removing the air pressure causes the ram 63 to retract thereby pulling the driving post 20 in a downward direction as discussed above, until the driving post 20 is in the collapsed condition. As discussed, pulling the driving post 20 downward will cause the remaining posts 20 to collapse, and the railing system 10 to a de-activated, or non-use condition. Likewise, removing air pressure passing through valve 54 and into line 62 causes the vehicle's parking brake 120 to disengage.

It will be apparent to those skilled in the art that it would be undesirable and unsafe to leave the safety rail system 10 in the raised, use condition while moving the tank 100. Likewise, it would be undesirable to permanently mount a fixed safety railing to the top of the tank because of safety considerations and issues of clearance needed when filling the tank 100, which can occur through openings in the top of the tank 100. Also, clearance can be desirable when pulling a tank 100 under bridges and other overhead obstacles. For these reasons, it is desirable to have a safety railing that can be lowered to a non-use position.

Referring to FIGS. 9 and 9A, the rail system 10 can further include a safety lanyard 233 that extends the length of the railing 30. In particular, a pair of hooks 232 that are fixedly received in apertures 32 disposed on opposite ends of the railing 30. Each end of the safety lanyard 233 is attached to the hooks 233 as shown in FIG. 9A. In application, the operator loops a prior art stopper (not shown) around the safety lanyard 233 and further attaches the stopper to the operator. As the operator walks along the top 160 of the tank, adjacent the railing 30, the stopper attached to the operator glides along the lanyard 233. Should the operator slip while walking along the top surface 160, the stopper attached to the safety lanyard 233 offsets lateral movement of the operator and prevent the operator from falling.

Though shown as a cover 65, it will be understood that a variety of operators could cooperate with the ladder to prevent use of the ladder until the safety railing and parking break are activated. For example, the ladder could fold into place and a mechanical actuator such as cables and pulleys could be used to control the movement of the railing 30. Further, though shown supported by posts 20, it will be understood that a variety of folding or collapsible structures could be used to support or create a safety railing at the top of a mobile structure.

Though shown on a tanker trailer 100, it will be understood that the safety railing could be used with other mobile equipment. For example, the safety railing could be used with train rail cars which commonly include ladders.

Figure 11:
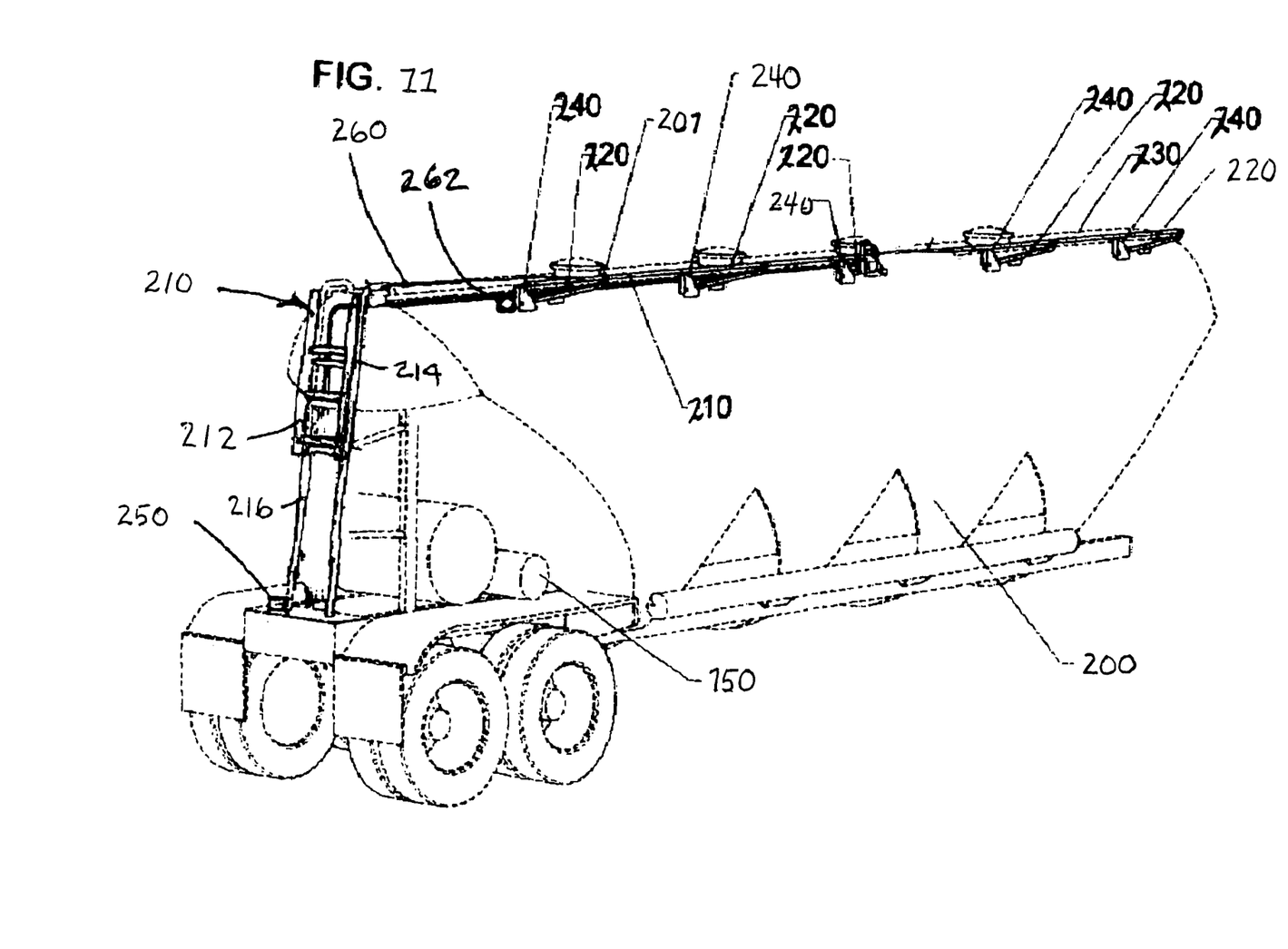
FIG. 11 is a perspective view of an alternate embodiment of the present invention, a collapsible safety railing apparatus installed to a tank.

FIG. 11 shows an alternate embodiment of the safety railing 201. In this embodiment, the ladder 210 is in two pieces, a fixed piece 214 and a sliding portion 212 that slides on fixed tracks 216. When the sliding portion 212 is slid down the tracks 216 it will contact an activating means switch 250 signaling the ladder 210 is in a use condition. The switch 250 can be an electrical switch that will set the tank 200 parking brakes. An actuating means cable 260 is attached to each post 220 and to the sliding portion 212 of the ladder 210 and as the sliding portion 212 is pulled down by the operator for use, the cable 260 pivots the post 220 about the mountings 240 raising the railing 230 for use. The switch 250 can include a lock portion that will hold the sliding portion 212 in its lowered position. A spring device 262 can be loaded as the sliding portion 212 is lowered and the spring device will return the railing 230 and sliding portion 212 to its non-use position when the lock portion is released.

Although the description above contains many specificities, these should not be construed as limiting the scope of the invention but as merely providing illustrations of some of the presently preferred embodiments of the invention. It will be obvious that embodiments described may be varied in many ways. Such variations are not to be regarded as a departure from the spirit and scope of the invention, and all such modifications as would be obvious to one skilled in the art are intended to be included within the scope of the present invention.

Thus the scope of the invention should be determined by the appended claims and their legal equivalents, rather than by the examples given.

I claim:

1. A collapsible safety railing used with mobile equipment, the safety railing comprising:

a railing adjacent a top surface of said mobile equipment, a ladder for accessing said top surface, activating means, actuation means, and wherein the activating means is adapted to send a signal, responsive to ladder use, to said actuation means to raise said railing and to activate a parking brake of said mobile equipment, a cover for covering at least a portion of said ladder in a non-use condition and a valve activated y movement of said cover to supply air pressure to said railing and said parking brake.

2. A safety railing adapted for use with mobile equipment, the safety railing comprising:

a ladder adapted for accessing an upper surface of said mobile equipment, said ladder having a use condition and a non-use condition, a vertically adjustable railing accessible from said upper surface, said railing wherein activation of the ladder from the non-use to the use condition will cause said railing to raise and will further cause activation of a parking brake of said mobile vehicle, a cover for covering at least a portion of said ladder in the non-use condition of said ladder and a valve activated by movement of the cover to supply air pressure to said vertically adjustable railing and said parkinq brake.

* * * * *